United States Patent
Barrett

(10) Patent No.: US 6,714,896 B1
(45) Date of Patent: Mar. 30, 2004

(54) METHOD AND APPARATUS FOR SIGNAL DEGRADATION MEASUREMENT

(75) Inventor: Paul Alexander Barrett, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/622,221

(22) PCT Filed: Mar. 11, 1999

(86) PCT No.: PCT/GB99/00731

§ 371 (c)(1),
(2), (4) Date: Aug. 15, 2000

(87) PCT Pub. No.: WO99/46884

PCT Pub. Date: Sep. 16, 1999

(30) Foreign Application Priority Data

Mar. 12, 1998 (EP) .............................................. 98301853
Mar. 12, 1998 (GB) .............................................. 9805330

(51) Int. Cl.[7] .......................... G06F 15/00; G01R 29/26
(52) U.S. Cl. .......................... 702/189; 702/69; 702/181; 375/224
(58) Field of Search .............................. 702/57, 66, 69, 702/81, 83–85, 122, 126, 179, 181, 189; 375/224, 227, 228; 455/67.1, 67.3, 296

(56) References Cited

U.S. PATENT DOCUMENTS

| | | | | |
|---|---|---|---|---|
| 5,151,579 A | * | 9/1992 | Maginness | 235/375 |
| 5,790,595 A | * | 8/1998 | Benthin et al. | 375/224 |
| 6,310,911 B1 | * | 10/2001 | Burke et al. | 375/224 |

FOREIGN PATENT DOCUMENTS

| | | | | |
|---|---|---|---|---|
| EP | 798888 A2 | * | 10/1997 | ............. H04L/1/00 |
| EP | 0 805 572 A2 | | 11/1997 | |
| GB | 2291570 A | * | 1/1996 | ............. H04L/1/12 |
| WO | WO 97/14235 | | 4/1997 | |

OTHER PUBLICATIONS

Hagenauer J et al. "A Viterbi Algoithm with Soft–Decision Outputs and its Applications", Proceedings of the IEEE Global Telecommunications Conference, Globecom '89, Dallas, TX, US. vol. 3, Nov. 27–30, 1989, pp. 1680–1686.*
Irvin D 4. "Automatically Reconfiguring Error Correon Method for Speech Communications System" IBM Technical Disclosure Bulletin, vol. 27, No. 3, Aug. 1, 1984, pp. 1441–1443.*
Hagenauer J et al. "A Viterbi Algoithm with Soft–Decision Outputs and its Applications", Proceedings of the IEEE Global Telecommunications Confeence, Globecom '89, Dallas, TX, US. vol. 3, Nov. 27–30, 1989, pp. 1680–1686.*
Irvin D 4. "Automatically Reconfiguring Error Correon Method for Speech Communications System" IBM Technical Disclosure Bulletin, vol. 27, No. 3, Aug. 1, 1984, pp. 1441–1443.*
IBM Technical Disclosure Bulletin. Nov. 1, 1977. "Selection of Optimal Speed for Modem Operation During Degraded Conditions". vol. 20, No. 6, pp. 2249–2251.*
Hagenauer J et al. "A Viterbi Algoithm with Soft–Decision Outputs and its Applications", Proceedings of the IEEE Global Telecommunications Conference, Globecom '89, Dallas, TX, US. vol. 3, Nov. 27–30, 1989, pp. 1680–1686.*

* cited by examiner

Primary Examiner—Marc S. Hoff
Assistant Examiner—Manuel L. Barbee
(74) Attorney, Agent, or Firm—Nixon & Vanderhye P.C.

(57) ABSTRACT

A method of measuring the degradation of a data stream owing to the influence of errors thereon is disclosed. Unlike known degradation measures, a measure calculated in accordance with the present invention takes into account the variation in the significance of an error in dependence upon the elements which are affected by it. A particular application of the method to the selection of one of a number of possible speech coding methods for use in transmitting speech across a radio link (20) from a mobile phone (10) to a base station (30) is described.

15 Claims, 3 Drawing Sheets

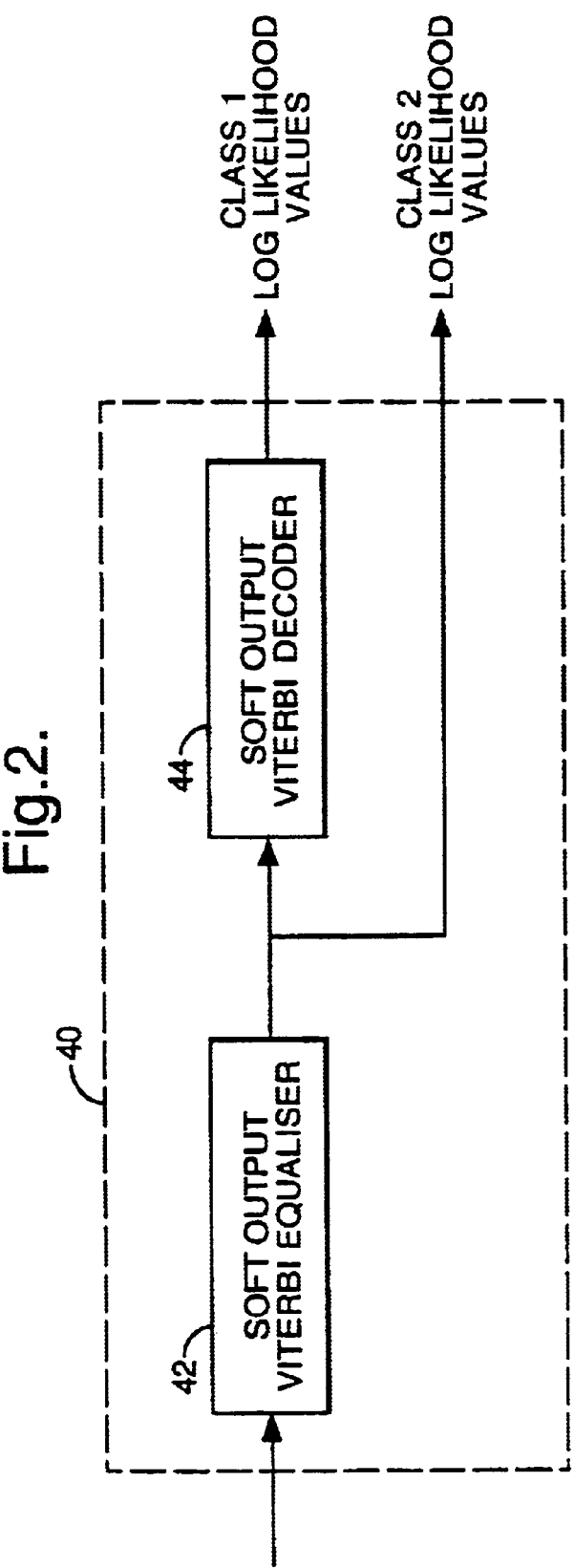

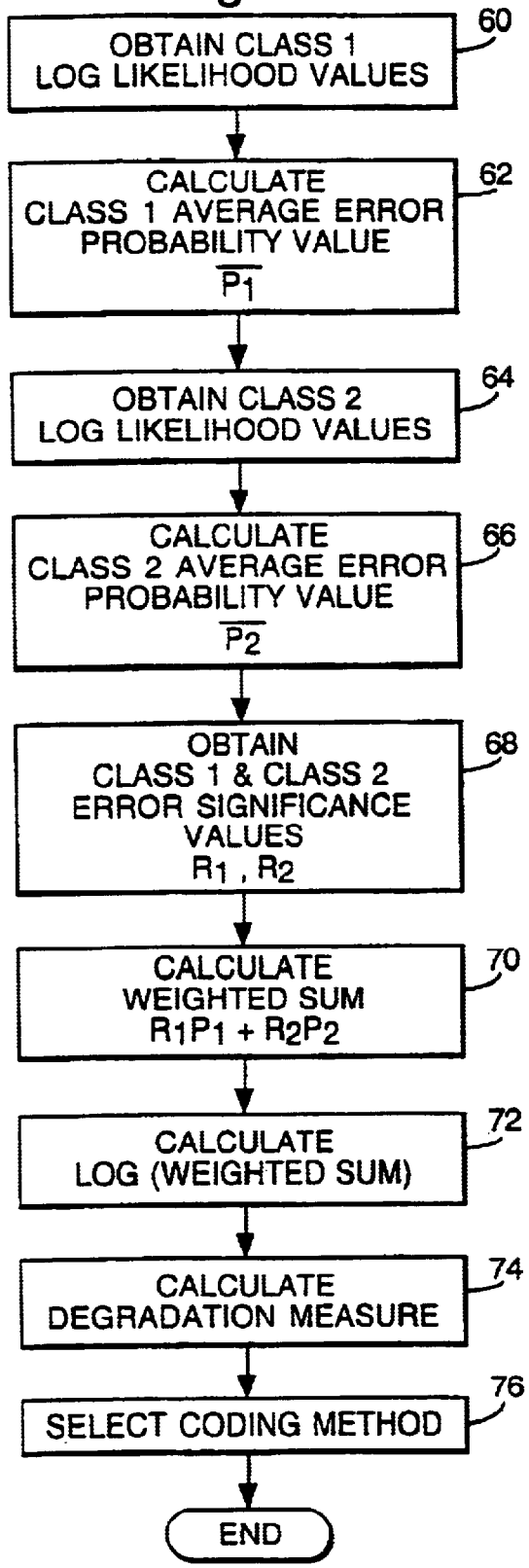

METHOD AND APPARATUS FOR SIGNAL DEGRADATION MEASUREMENT

BACKGROUND OF THE INVENTION

1. Field of the Invention

The present invention relates to methods of, and apparatus for, measuring the degradation of a data stream. It has particular utility in relation to providing a measure for use in selecting a speech coding rate for use over a radio communication link between a mobile telephone and a fixed network.

2. Description of Related Art

Conventionally, degradation of a data stream has been estimated on the basis of a measurable parameter of the channel over which the data stream has been sent. For example, the degradation of coded speech carried over a radio channel has hitherto been estimated on the basis of a measured radio channel parameter such as the Carrier to Interferer (C/I) ratio or the Bit Error Rate. In practice, it is found that such estimates are unreliable indicators of the degree of degradation experienced by the data stream.

European patent application no. 0 798 888 discloses a speech encoder/decoder for use in a mobile telephone. The encoder divides the incoming speech into frames and derives a set of speech parameters for each frame. The decoder is operable to receive decoded speech parameters for a frame and to determine whether they contain errors that are so significant that they are unsuitable for generating synthesised speech. In making the determination, the encoder arranges the bits it outputs according to their importance to the quality of the decoded speech. Each bit is associated with an importance class which is in turn associated with a importance value. A checksum is applied to each class of bits at the encoder. The decoder analyses the checksum and thereby indicates whether the associated class contains any errors. The importance values for those classes which contain errors are then added together and their sum is compared to a threshold. If the sum exceeds the threshold then the decoded parameters are deemed unsuitable for generating synthesised speech.

EP 0 798 888 discloses a measure of the degradation of one section of a data stream. When measuring the degradation of a data stream comprising a plurality of sections, it is not obvious that the measure for one section is any better than the conventional measurements of Bit Error Rate.

SUMMARY OF THE INVENTION

A first aspect of the present invention provides a method of measuring the degradation caused by the influence of errors on a data stream comprising a plurality of sections, said method comprising the steps of:
  retrieving stored error significance values associated with respective error significance classes of one or more digits of a section of said data stream;
  determining error likelihood measures for respective error likelihood classes of one or more digits in said section;
  calculating a degradation measure on the basis of the sum over said section of said error likelihood measure for each digit weighted by the error significance value associated with that digit.

The present inventor realised that such a degradation measure (i.e. one based on a sum over a section of an error likelihood estimate for each digit weighted by an error significance value for each digit) is a better measure of the degradation of a data stream than a Bit Error Rate or the like. This is because many coding schemes are designed to give an inverse correlation between the likelihood of a received digit being in error and the significance of an error in that digit. Where there is such a correlation, the coding scheme will operate to reduce the impact of an increase in Bit Error Rate. The measure according to the present invention takes the effect of such coding schemes into account.

It is anticipated that, in the majority of embodiments of the present invention, said digits will be bits (binary digits). The invention might also be applied to other forms of coding such as quaternary or octal coding.

In some embodiments, said error significance classes comprise bits at predetermined positions in the sections, and said error significance values retrieving step involves determining the class to which a bit belongs on the basis of the position of said bit within the section.

Some channel encoding/decoding algorithms provide a measure indicative of the likelihood of error in each decoded bit. Hence, in some embodiments said error likelihood measures are provided on the basis of an error likelihood measure provided for each bit by a channel decoding method. This has the advantage that the calculation of the degradation measure can be implemented without increasing the bit-rate of the transmitted signal.

As stated above, one application of the present invention is in the selection of a coding scheme to be used over a communication link between a sender which is operable to encode a signal using a selected one of a number of possible coding methods and a receiver. Therefore, according to a second aspect of the present invention, there is provided a method of selecting a signal encoding method for use over a communications link, said method comprising:
  carrying out a method according to the first aspect of the present invention to determine said degradation measure on the basis of a received portion of said data stream; and
  selecting one of a plurality of encoding methods on the basis of said degradation measure.

According to a third aspect of the present invention, there is provided a method of measuring the degradation of a section of a data stream owing to the influence of errors thereon, said method comprising the steps of:
  retrieving stored error significance values associated with respective error significance classes of one or more digits of said section; said method being characterised by;
  determining error likelihood estimates for respective error likelihood classes of one or more digits in said section;
  calculating a measure of said degradation on the basis of the sum over said digits of said error likelihood estimate for each digit weighted by the error significance value associated with that digit.

By determining an estimate of the likelihood of each digit of the section being in error, a more precise measure of the degradation suffered by a section of the data stream transmitted across a communication link is obtained. This is useful in situations where it is important to determine more precisely the extent to which a group of digits has been corrupted. The term estimate is intended to exclude variables that have only two possible values.

BRIEF DESCRIPTION OF THE DRAWINGS

By way of example only, specific embodiments of the present invention will now described with reference to the accompanying drawings, in which:

FIG. 2 is a schematic illustration of components of a channel decoder used in the network; and FIG. 3 is a flow chart illustrating the operation of the receiver which contains the channel decoder.

DETAILED DESCRIPTION OF EXEMPLARY EMBODIMENTS OF THE INVENTION

Figure 1:
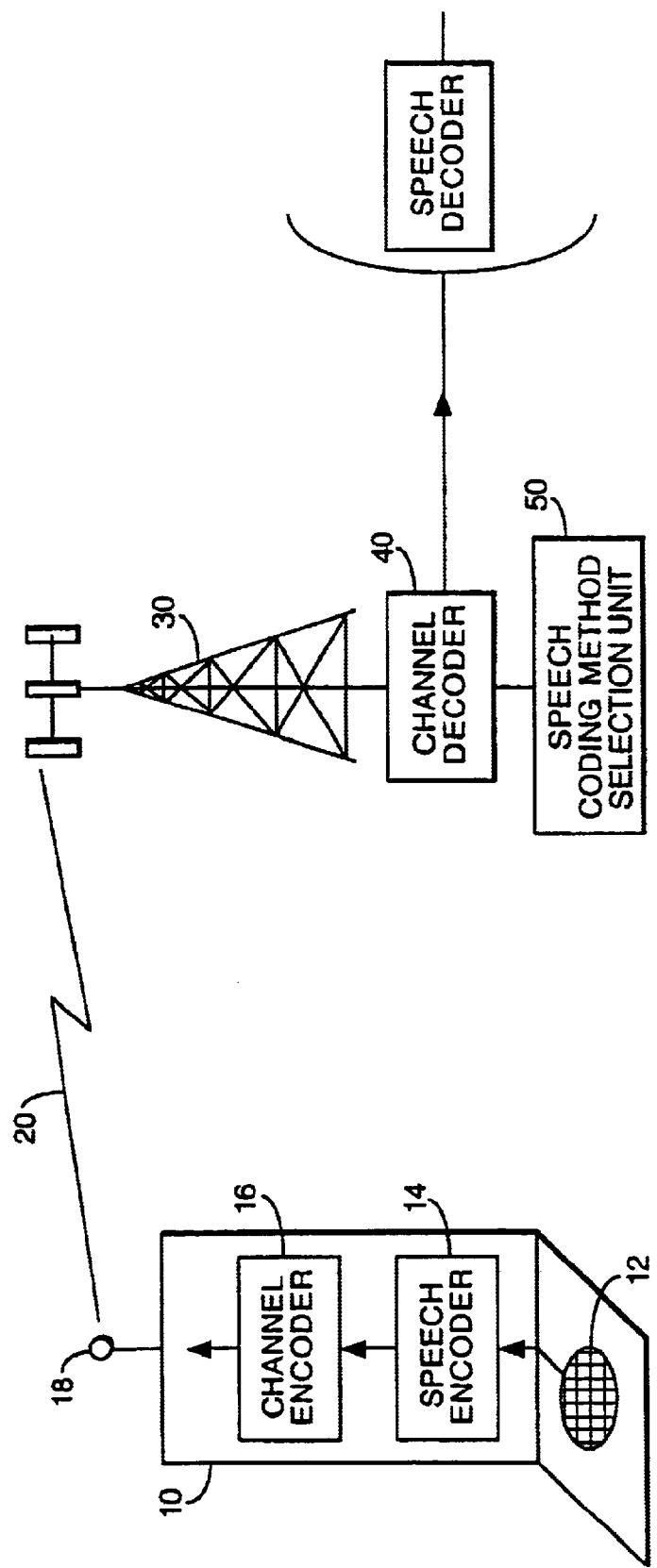
FIG. 1 is a schematic illustration of part of a network providing mobile telephony.

A first embodiment (a mobile radio speech transmission system) is schematically illustrated in FIG. 1. A mobile telephone 10 includes a microphone 12 which receives a user's voice and samples it at 125 microsecond intervals to provide a binary data stream. This data stream is then passed to an speech encoder 14 which operates on one block of samples at a time (the blocks of samples are known as a 'frames' in the art) to provide a compressed data stream representing the user's speech. The compressed data stream passes to a channel encoder 16 which further adds error detection and correction bits to the compressed data stream to provide a transmission data stream (in practice, the mobile phone 10 will also encrypt the speech data at some stage in the encoding process). The transmission data stream is then used to modulate a radio carrier signal which is transmitted from the antenna 18 of the mobile phone 10 across a radio link 20 to a base station 30.

The mobile telephone 10 is operable to use three different speech/channel coding methods. In all three cases, the blocks of samples input to the speech encoder 14 represent 20 ms of the user's voice.

A first speech/channel coding method (method A) involves the phone 10 operating in accordance with the Global System for Mobile communications (GSM) full-rate standard. In other words, each input speech frame is processed by the speech encoder 14 to give a set of 260 bits (i.e. the speech is coded at 13 kbits$^{-1}$). 182 of the 260 bits are known as class 1 bits, the remaining 78 bits are known as class 2 bits. The set of class 1 bits comprises 50 class 1A bits and 132 class 1B bits. The class 1A bits are deemed especially important to speech quality. The class 1B bits are deemed to be less important than the class 1A bits, but more important than the class 2 bits. T he channel encoder 16 applies a 3-bit Cyclic Redundancy Checksum to the class 1A bits before adding four tail bits and performing convolution coding. These processes add 196 error detection and correction bits to the class 1 bits. In contrast, no further processing of the class 2 bits takes place in the channel encoder 16. This increases the data rate of the transmission data stream sent across the radio link 20 to 22.8 kbits$^{-1}$.

A second coding method (method B) involves the speech encoder 14 producing speech coded at 10 kbits$^{-1}$ and the channel encoder 16 adding 12.8 kbits$^{-1}$.

A third speech coding method (method C) involves the speech encoder 14 producing speech coded at 8 kbits$^{-1}$ and the channel encoder 16 adding 14.8 kbits$^{-1}$.

As will be known by those skilled in the art, the error characteristics of the link 20 change over time owing to radio propagation effects such as attenuation, fading and shadowing. In low error conditions scheme A will provide the best overall speech quality, owing to the high speech coding rate; in very high error conditions scheme C will provide the best overall speech quality, owing to the increased obtuseness; scheme B will be best in medium error conditions.

The selection of the speech coding method to be adopted by the mobile phone 10 in encoded the user's speech for transmission across the radio link 20 is made at the base station 30. Once the base station 30 determines the speech coding method to be adopted it sends a signal across the radio link 20 which controls the mobile phone 10 to encode speech using the selected method.

The method by which the base station determines which speech coding method is to be used is described below with reference to FIGS. 2 and 3.

FIG. 2 shows two components of a channel decoder 40 which forms part of the base station 30. The radio carrier signal is demodulated at the base station 30 to recreate as accurately as possible the transmission data stream. The recreated transmission data stream will normally differ from the transmitted data stream owing to errors being introduced in transmission across the link 20. The soft output Viterbi equaliser 42 receives the recreated transmission data stream and, in effect, adjusts the data stream to compensate for measurable characteristics of the radio link 20. The operation of the equaliser and the training sequences added to the transmitted data stream in order to control its operation will be understood by those skilled in the art.

Importantly for the present embodiment, the Viterbi equaliser 42 outputs both the estimated true value of each of the bits within the recreated transmission data stream and a value which indicates the probability that the bit is in error. In more detail, the equaliser operates in accordance with the well known Soft Output Viterbi Algorithm (SOVA) described in J. Hagenauer and P. Hoeher, "A Viterbi Algorithm with Soft-Decision Outputs and its Applications", Proc. GLOBECOM, pp1680–1686 (1989), which is incorporated herein by reference. The equaliser therefore outputs a log likelihood value for each bit according to the following equation:

$$sd_i = \ln\left(\frac{1-p_i}{p_i}\right) \quad \text{Equation (1)}$$

where $sd_i$ and $p_i$ are the log likelihood value and probability of error for the $i^{th}$ bit of the transmission data stream respectively. The log likelihood values for the class 2 bits are passed to a speech coding method selection unit 50. The log likelihood values for the 378 bits generated from the 182 class 1 bits are passed to a soft output Viterbi decoder 44. The Viterbi decoder 44 also uses the SOVA algorithm and regenerates the 182 class 1 bits together with a log likelihood value for each class 1 bit indicating the probability that the bit is in error. It will be realised that the log likelihood values associated with the class 1 bits will normally be higher than those associated with class 2 bits.

The operation of the speech coding method selection unit 50 will now be described with reference to FIG. 3.

Firstly, in step 60, the log likelihood values for the class 1 bits are obtained. These values are then processed and averaged (step 62) to give a mean probability of error value for the class. This is done in accordance with the following equation:

$$\bar{p}_k = \frac{1}{L_k} \sum_{i=0}^{L_k-1} \frac{1}{(1+e^{sd_{i,k}})} \quad \text{Equation (2)}$$

where $sd_{i,k}$ is the log likelihood value associated with the $i^{th}$ bit of class k, $L_k$ is the number of bits in class k; $\bar{p}_k$ is an average probability of an error in any given bit in class k (k being set to 1 in step 62, $L_1$ therefore being 182).

A process similar to that carried out in steps 60 and 62 is then carried out on the using the class 2 log likelihood values in steps 64 and 66.

Error significance values representing the significance of errors in the two classes are then obtained from memory in the speech coding and selection unit 50 (step 68). One method by which these values (which are constant over time) might be arrived at is described later.

A sum over the classes of the averaged probability of error for the class weighted by the error significance values associated with the class is then calculated (step 70). This calculation may be represented by the equation:

$$\hat{E}(N) = \sum_{k=0}^{K-1} \overline{p}_k r_k \quad \text{Equation (3)}$$

where $r_k$ is the error significance value associated with class k, K is the number of classes (i.e. 2 in the present case) and $\overline{p}_k$ is as defined above.

The logarithm of the weighted sum is then calculated in step 72. This provides a log weighted sum represented by the equation:

$$\hat{E}(SNR) = -10 \log_{10} \sum_{k=0}^{K-1} \left( \frac{r_k}{L_k} \sum_{i=0}^{L_k-1} \frac{1}{(1+e^{sd_{i,k}})} \right) \quad \text{Equation (4)}$$

Where E(SNR) represents the log weighted sum which is, in effect, an expected value of the signal to noise ratio of the recreated transmission data stream.

In practice, it has been found that measures based on 20 ms frames are noisy, and a better measure is produced by filtering the estimated SNR figure over a small number of frames using a moving average filter. The final degradation measure M for frame j is therefore calculated in accordance with the following equation (step 74):

$$M_j = \frac{1}{N} \sum_{i=0}^{N-1} \hat{E}_{j-i}(SNR) \quad \text{Equation (5)}$$

where N is the length of the averaging filter in frames; and $\hat{E}_j(SNR)$ is the estimated expectation of the SNR calculated according to Equation (4) for frame j. For 20 ms frames a good value of N is 10, which is equivalent to a measurement window of t=200 ms.

The degradation measure thus calculated is then used to select the best channel coding method (step 76) as follows. For each coding method, two thresholds are defined and the following rules used to select the channel coding method at time t based on the value of M calculated over the most recent ten frames:

If current method is A: if M<Th1 then new mode is B;
   if M<Th2 then new mode is C;
   where Th2<Th1.

If current method is B: if M>Th3 then new mode is A;
   if M<Th4 then new mode is C;
   where Th3>Th4.

If current method is C: if M>T5 then new mode is A;
   if M>T6 then new mode is B;
   where Th5>Th6.

Since a different speech coding algorithm will be used in each method, the respective values of M cannot necessarily be compared directly. However, to avoid an oscillation between coding methods, the values of the thresholds Th1 to Th6 should be chosen such that the overall operation of the system exhibits hysteresis. That it to say, if the values of M for different methods were comparable, then:

Th3>T1 and Th5>T1;
Th1>Th6;
Th6>T2 and Th6>T4.

It will be seen how the degradation measure defined above more reliably indicates the impact of errors on the quality of the encoded speech than prior methods that have only considered the Bit Error Rate suffered by the data stream as a whole. As a result an improved selection of channel coding method is provided.

One procedure for determining values for $r_k$ is now described, although other methods could be used. First a speech file of a suitable duration, for example 2 minutes, is processed through a simulation of the speech and channel encoders (14,16) to produce a reference channel file. This file is then further processed through the simulated speech and channel decoder to produce a reference speech output file. For each bit position (i,k) a segmental SNR, which is known to the art, is calculated between the reference output file, and a degraded output file that is produced from the reference channel file with the $i^{th}$ bit in class k inverted in every frame. The segmental SNR value is used since it better predicts the subjective effect of additive noise than a normal SNR calculation. Since unity frame energy is assumed in the calculation of the metric, we can estimate $r_k$ to be:

$$r_k = \sum_{i=0}^{L_k-1} \frac{1}{10^{0.1 Q_{i,k}}} \quad \text{Equation (6)}$$

where $Q_{i,k}$ is the segmental SNR expressed in dB, calculated between the reference output file and the degraded output file that was produced by inverting the $i^{th}$ bit in class k for every frame.

In practice, the above calculation could be replaced by any measure of the degradation introduced by an error in bit position (i,k). Possible alternatives include the use of an objective measurement metric, such as that defined in ITU-T Rec. P.861, or mean opinion scores from subjective tests.

In many systems, cyclic redundancy check (CRC) bits are employed to detect uncorrected errors in the most sensitive bits. In the event that residual errors are detected, a bad frame is declared and an error concealment algorithm is invoked that estimates the corrupted parameters on the basis of their most recent values. The output gain is usually attenuated over successive bad frames until the signal is completely muted. A typical muting period might be five 20 ms frames. Since the error concealment algorithm will generally reduce the subjective effect of bad frames, in the case of detected bad frames, the metric in Equation (5) can be replaced by a pre-determined constant, which can be decreased over successive bad frames to represent the effect of the muting algorithm. Metric values for bad frames can be determined in a similar manner to the values for $r_k$.

In a preferred embodiment the measure M is calculated using a so-called 'bottom tracking' algorithm rather than the moving average filter described above. In this case, the log weighted sum obtained for the previous frame in step 72 is increased by one eighth of a decibel and compared to the log weighted sum obtained for the current frame. If the increased log weighted sum is less than or equal to the log weighted sum derived from the current frame then the measure is set to the former. If, however, the contrary is true, then the measure is set to the latter.

In Equation (2) above, the probability measures for the different bits within a significance class are averaged to provide a single value for each class. In alternative embodiments this averaging step is avoided, the values $p_i$ for each bit being used instead.

In the above-described embodiments, two significance classes of bits (class 1 and class 2) are used. However, any number of classes may be used and in the extreme case each class may contain a single bit.

As a further alternative, the mobile telephone apparatus 10 may carry out the calculation of the degradation measure rather than the base station 30.

Although the above embodiment involves the transmission of encoded speech over a radio link, the present invention is applicable to other forms of data and other transmission media. The data stream may, for example, include encoded video, facsimile or computer data or a mixture of these. The transmission media may, for example, be microwaves or electrical signals over copper wires.

What is claimed is:

1. A method of measuring degradation caused by influence of errors on a data stream comprising a plurality of sections, said method comprising:
   retrieving stored error significance values associated with respective error significance classes of one or more digits of a section of said data stream;
   determining error likelihood measures for respective error likelihood classes of one or more digits in said section; and
   calculating a degradation measure solely on the basis of the sum over said section of said error likelihood measure for each digit weighted by the error significance value associated with that digit.

2. A method according to claim 1 wherein said digits are bits.

3. A method according to claim 2 wherein said error significance classes comprise bits at predetermined positions in the sections, and retrieving the stored error significance values involves determining the class to which a bit belongs on the basis of the position of said bit within the section.

4. A method according to claim 1 wherein said error likelihood values are provided by a channel decoding method.

5. A method according to claim 4 wherein said error likelihood classes comprise one bit, said error likelihood values being provided on the basis of an error likelihood measure provided for each bit by a channel decoding method.

6. A method of selecting a signal encoding method for use over a communications link, said method comprising:
   carrying out the method of claim 1 to determine said measure on the basis of a received portion of said data stream; and
   selecting one of a plurality of encoding methods on the basis of said measure.

7. A method according to claim 6 wherein said selection is between encoding methods featuring different proportions of signal coding and channel coding.

8. A method according to claim 6 wherein said signal represents speech.

9. Apparatus operable to measure degradation caused by influence of errors on a digital data stream comprising a plurality of sections, said apparatus comprising:
   input means for receiving a signal encoding said section;
   means arranged in operation to retrieve stored error significance values for respective significance classes of digits, each of said significance classes comprising one or more digits of said section;
   means arranged in operation to determine error likelihood measures for respective error likelihood classes comprising one or more digits of said section; and
   means arranged in operation to calculate a measure of said degradation solely on the basis of the sum over said section of said error likelihood measure for each digit weighted by the error significance value for that digit.

10. Apparatus according to claim 9 wherein said digits are bits.

11. An apparatus according to claim 10 further comprising:
    means arranged in operation to select an encoding method responsive to said determination of said measure; and
    means arranged in operation to send an indication of the encoding method to be used to the sender of the data stream.

12. A radio communications receiver comprising an apparatus according to claim 9.

13. A mobile telephone apparatus comprising an apparatus according to claim 9.

14. A method of measuring degradation of a data stream owing to influence of errors thereon, said method comprising:
    determining a plurality of error significance values for respective significance classes of bits, each of said significance classes comprising one or more bits of said data stream;
    determining an error susceptibility value for each bit in said data stream; and
    calculating a measure of said degradation solely on the basis of the sum over said bits of said error significance values weighted by said error susceptibility values;
    wherein said susceptibility classes comprise one bit, said error susceptibility values being provided on the basis of an error likelihood measure provided for each bit by a channel decoding method.

15. A method of measuring degradation of a section of a data stream owing to influence of errors thereon, said method comprising:
    retrieving stored error significance values associated with respective error significance classes of one or more digits of said section;
    said method being characterised by:
    determining error likelihood estimates for respective error likelihood classes of one or more digits in said section; and
    calculating a measure of said degradation solely on the basis of the sum over said digits of said error likelihood estimate for each digit weighted by the error significance value associated with that digit.

* * * * *